United States Patent [19]

Braddock, III

[11] 4,412,287
[45] Oct. 25, 1983

[54] AUTOMATED STOCK EXCHANGE

[76] Inventor: Walter D. Braddock, III, 70 W. Fairview, Springfield, Ill. 62707

[21] Appl. No.: 418,297

[22] Filed: Sep. 15, 1982

Related U.S. Application Data

[63] Continuation of Ser. No. 581,840, May 29, 1975, abandoned.

[51] Int. Cl.³ .................... G06F 15/20; G06F 15/24
[52] U.S. Cl. .................................. 364/408; 364/200; 364/300
[58] Field of Search ............... 364/200, 300, 408, 900

[56] References Cited

U.S. PATENT DOCUMENTS

| | | | |
|---|---|---|---|
| 3,259,886 | 7/1966 | Singer et al. | 364/200 |
| 3,378,820 | 4/1968 | Smith | 364/200 |
| 3,573,747 | 4/1971 | Adams et al. | 364/200 X |
| 3,581,072 | 5/1971 | Nymeyer | 364/408 X |
| 3,848,233 | 11/1974 | Lotan et al. | 364/200 |

*Primary Examiner*—Felix D. Gruber
*Attorney, Agent, or Firm*—Stern & Roberts

[57] ABSTRACT

An automated stock exchange in which a computer matches buy and sell orders for a plurality of stocks. An open board simultaneous trading environment is simulated through two stages. The first stage is an order accumulation period which is continuously in operation except for one stock in the second stage. The second stage is an extremely rapid sequential call through. All orders for a given stock are available to customers during the first stage. During the second stage market orders are matched with market orders, then market orders are traded against limit orders as the trading price changes within controlled ranges. The system will also process stop orders, and other specialized transactions.

1 Claim, 6 Drawing Figures

Fig. 2 ORDER EXECUTION FLOW OF OPERATIONS
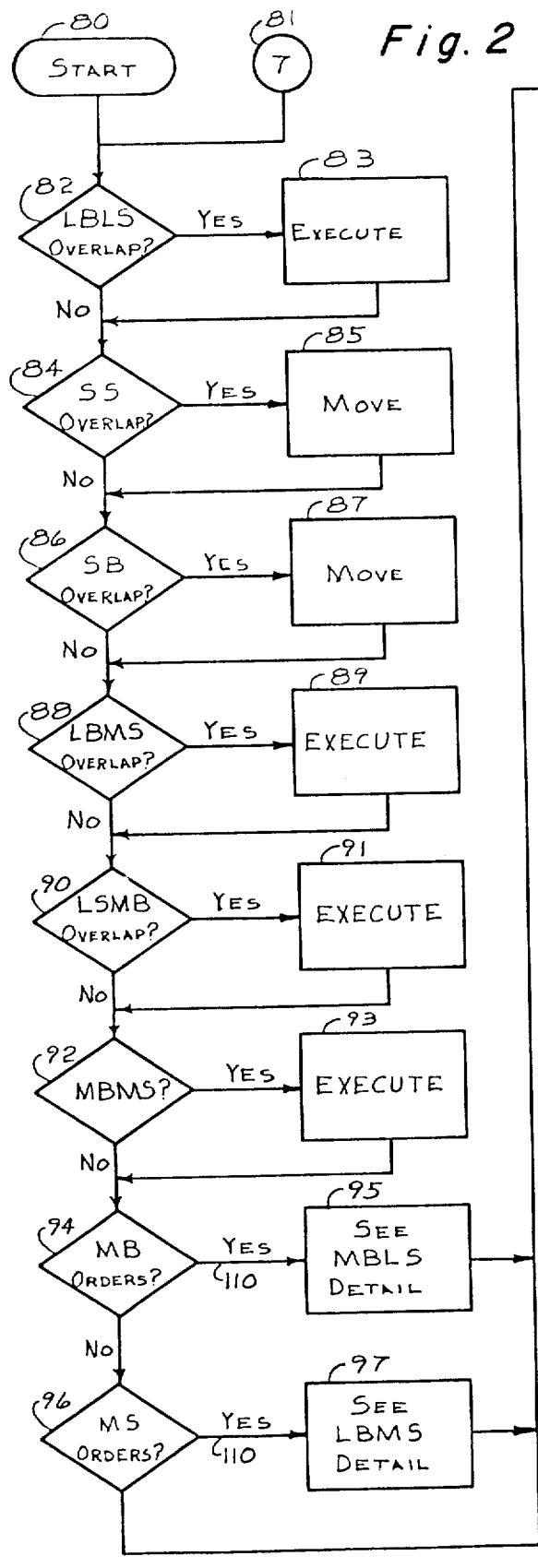
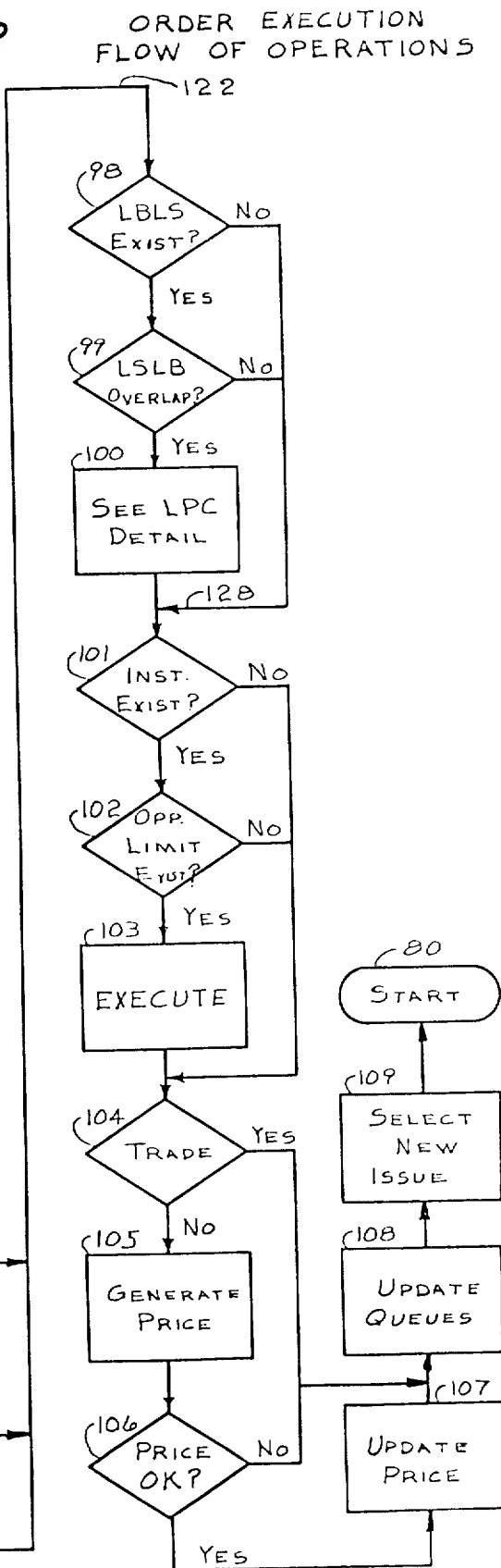

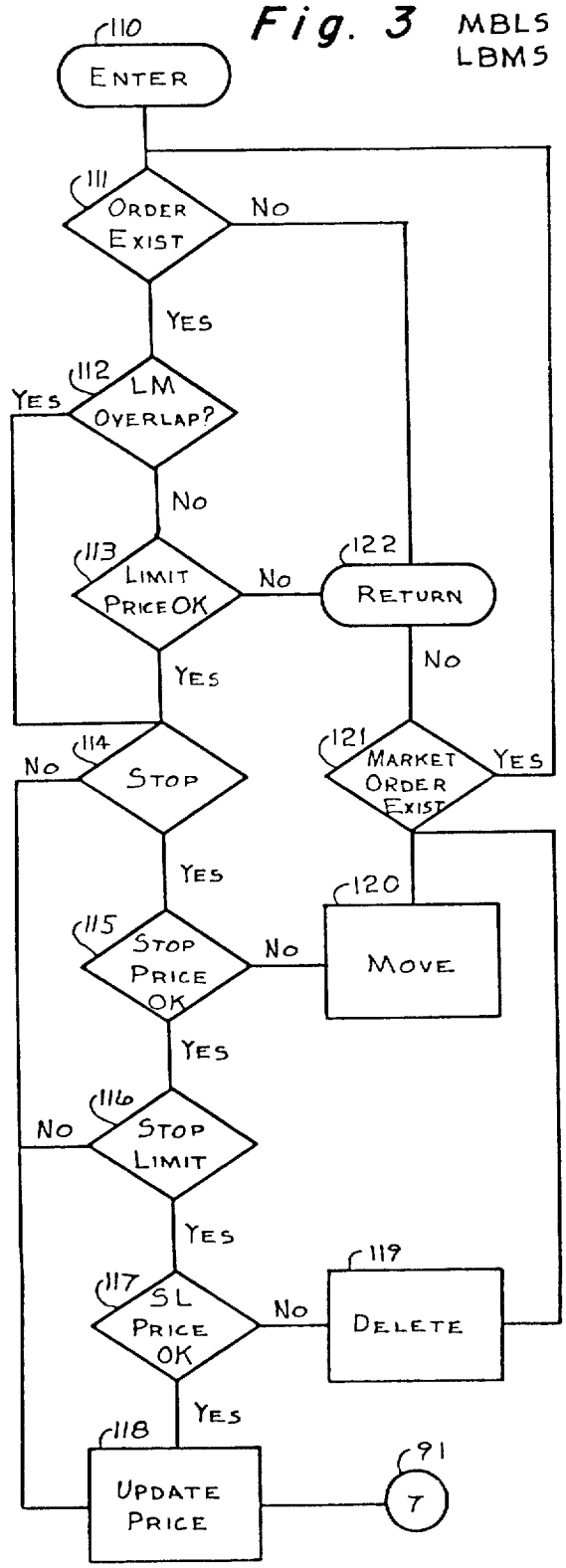
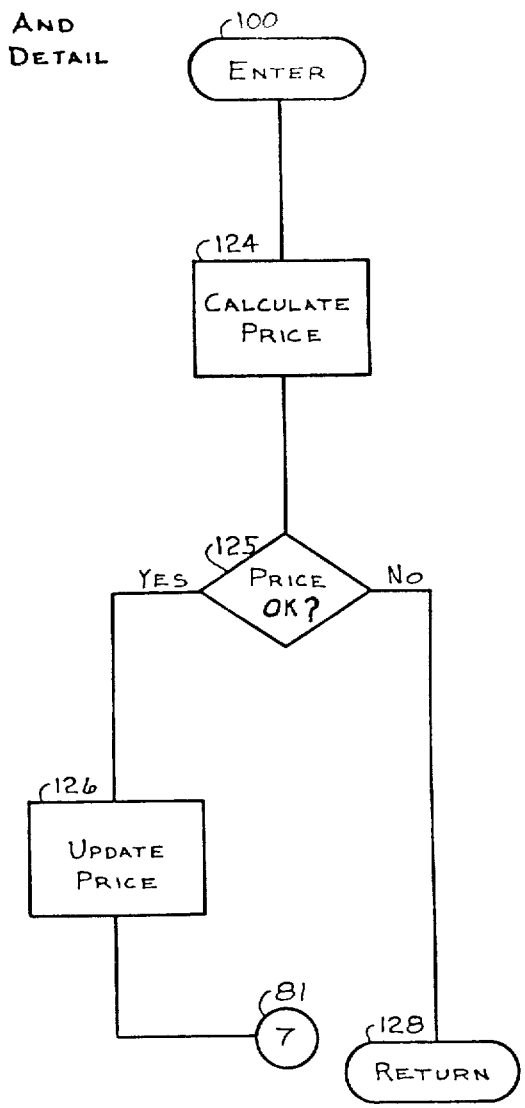
Fig. 3 MBLS AND LBMS DETAIL
Fig. 4 LPC DETAIL

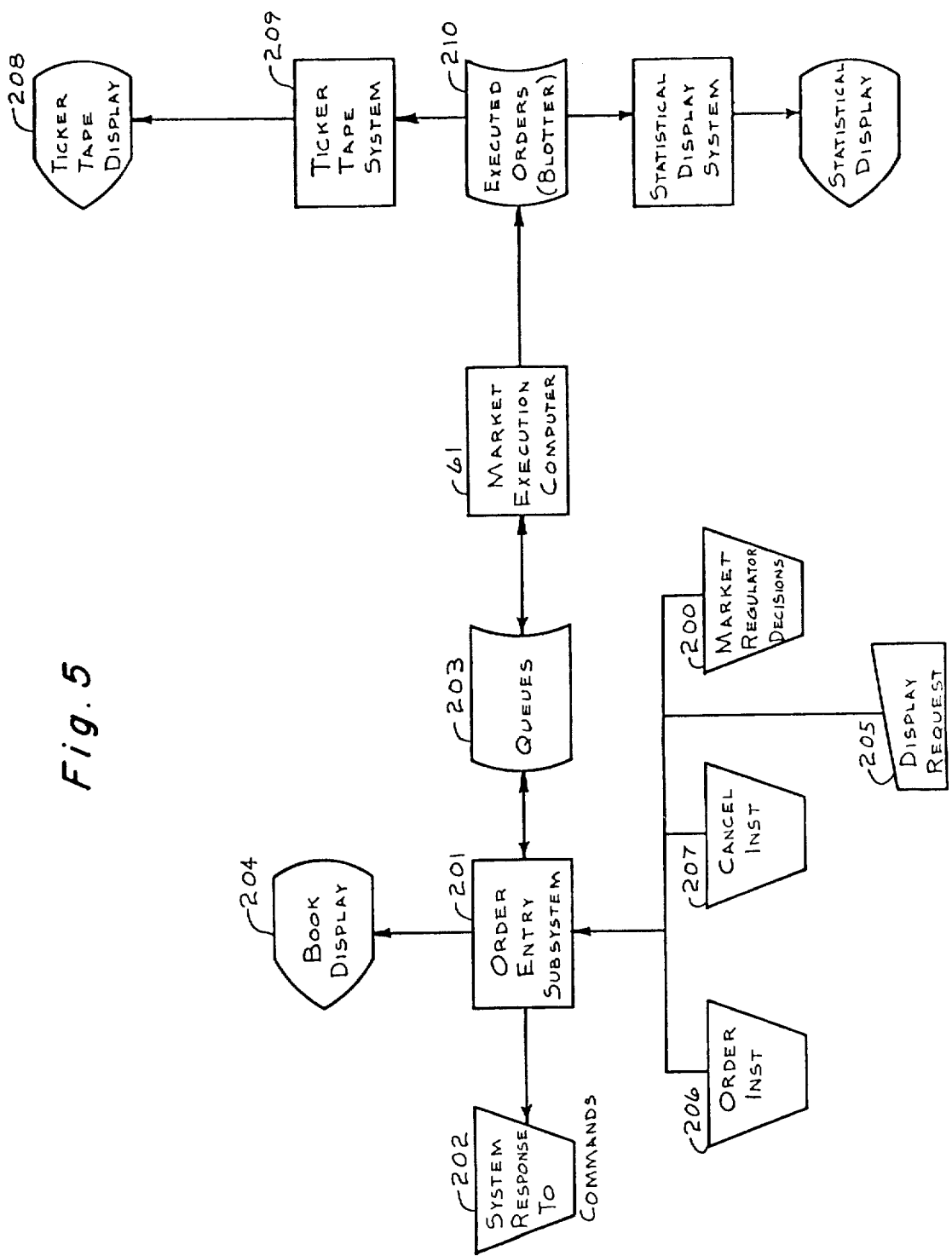

AUTOMATED STOCK EXCHANGE

This application is a continuation application of Ser. No. 581,840, filed May 29, 1975 and now abandoned.

INDEX

Cover Page
Abstract
Index
Description of Prior Art
  The Call Through System
  The Open Board System
  NASDAQ
  Instinet
  Computation System
Summary of Invention
Brief Description of Drawings
Hardware Description
Order Entry System
  Regulator Decisions
  Order Instructions
  Cancel Instructions
  Display Requests
Order Execution System
Specific Examples
Input Messages and System Responses
File Descriptions
Program Descriptions
Alternative Embodiments

DESCRIPTION OF PRIOR ART

The Call-through System

This system was used as early as the 18th century in New York, and is today used on the Honolulu and the Salt Lake City Stock Exchange. It is a seriatim auction market for each of the stocks on a given exchange.

The caller announces the stock to be traded and solicits bids and offers. If he receives bids but no offers at a given price, he solicits offers by raising the call price. Trading continues so long as orders continue to be executed. When no further trading is possible, the caller than moves to the next stock. The caller, like the auctioneer, is not a party to the trade.

The Open Board System

This system introduced in the United States after the Civil War. Simultaneous trading in stocks is made possible by a plurality of trading posts at the exchange.

The member brokers send their orders for trades on all stocks to their agent on the exchange, the floor broker takes these orders to the trading post for that stock. At the post a trader or specialist in one or more stocks accepts orders. The specialist may match the new order with a prior order and act as an agent for buyer and seller, receiving a commission from both. Alternatively, the specialist may enter the trade as a principal, negotiating to buy or sell the stock. In some cases, two parties at a post may consummate a trade independently of the trader or specialist.

The open board exchange as it has developed on the major exchanges accepted as a feature the specialist who fills several roles. In some instances the specialist acts only as the agent of both parties. In all instances, the specialist is the agent of the exchange, with the obligation of maintaining an orderly market in the stock, controlling the price rise and fall of the trading. The specialist also acts as a trader for his own account seeking to earn a trading profit while fulfilling his other obligations.

The orders placed with the trader are termed "The Book". The book is closed in that only the specialist knows of his pending order. A floor broker negotiating a trade does not know if the specialist is trading for his account or another's. This preferred position of the specialist is the currently stated quid pro quo for his obligation as a market maker.

NASDAQ

The NASDAQ system was introduced in 1971 and is used by the National Association of Securities Dealers for trading and over the counter stocks.

For every stock, there are several association members who are market makers. Each of them communicate with the system, transmitting their bids and offers. The system resequences all of these quotes to display the lowest five offers and highest five bids.

Any member broker may obtain this display on his terminal and communicate with any of the market makers to negotiate a sale.

The NASDAQ system therefore serves as a communication system for geographically dispersed multiple market makers and brokers. The system as described does not include order execution and the clearing of orders.

INSTINET

The Instinet system is described in U.S. Pat. No. 3,573,747 issued on Apr. 6, 1971. The system includes a series of terminals, each accessible to a member and a central computer.

Each member may submit for display a firm offer to buy or sell a given number of shares of a certain security at a stated price. The member may also submit bids or offers of a security without price. This information, minus the submittor's identity, is displayed to all members, in a price sequence.

Any member may respond to an offer through the negotiating option of a counteroffer and the system will allow private communications between the two members until and if an agreedupon price is reached. Alternatively, a member may submit an acceptance of any offer displayed to all members.

In either option, the system executes orders when a buyer and seller have agreed upon a price. The parties to an executed trade deliver the shares of stock and purchase price to a designated bank for a conventional clearing operation. If a bid and an ask are submitted at the same price, the system will consummate the trade.

Each order execution is triggered by an immediately previously submitted offer to buy or sell. Expressed otherwise, each order is immediately executed against a booked order or is itself booked.

COMPUTATION SYSTEM

A system for a computer based stock exchange is disclosed in U.S. Pat. No. 3,581,072 issued on May 25, 1971, to Frederick Nymeyer. The system exchange accepts orders to buy and sell stock both at given prices, (limit orders) and orders to buy and sell stock at the market price (market orders), and executes all orders where a purchaser can be found willing to pay a price at or greater than the price offered by any seller.

The Nymeyer system includes a central computer and remote terminals for each of the brokers utilizing the system. The brokers submit orders which identify the stock, the size of the order, whether it is to buy or sell, and whether it is a price (limit) or a market order.

All of the buy orders are collected, broken down into 100 share orders and sequenced first by price from highest to lowest, and second, by time of order. A similar sequence is made of sell orders from the lowest price to the highest price.

The lists are then compared matching the first round lot buy (at the highest price) with the first round lot set (at the lowest price). Lots are further matched so long as the decreasing buy price is as high or higher than the increasing sell price. When this last transaction is reached, all trades are executed at this new "market price".

For purpose of insertion in the array, all market orders are entered at slightly above the old market price for buys and below the old market price for sales. In a rising or falling market, the market orders are keyed to the new "market" price.

SUMMARY OF INVENTION

The signal features of my automated exchange are a central computer system for order execution and active terminals at each member broker's office for the entry of orders.

These features will allow the display on multiple remote terminals of not only the past transactions as is currently available but the actual orders of customers. The exchange serves the function of the market maker and displays an open book of all actual bids and quotes to all potential customers.

All stock exchanges involve as a necessary element of the sale of securities, a barter or negotiation over the price of sale. A feature of this automated exchange, is a customer or his individual broker may directly negotiate with opposing customers through the submission, withdrawal or amendment of varying limit and market buy orders. In this manner, every participant in the market fulfills a part of the current function of the market maker or specialist on an exchange.

Another feature of this exchange is that it will handle all orders from a single share to thousands of shares. It thus eliminates the various tiers of the current market based on the size of orders.

This exchange utilizes the extremely high speed processing capability of modern computers to all hundreds or thousands of stocks to be traded, sequentially, in a few minutes' time. The computer uses efficient sequential processing equivalent to the call through while appearing to the user, the brokers and customers, to be the equivalent of an open board system which attempts to execute their order very promptly after submission. For each stock, therefore, the computer has two phases to each cycle. The first cycle is the order collection and display and the second cycle is the order execution.

Another feature of this exchange is a continuously changing market price during execution based on the orders submitted by the customers. Briefly, after market orders are cleared, the market orders are tested against opposing limit orders. This will cause the market price to change.

Another feature of this exchange is that it allows for human intervention, hereinafter termed the Regulator to control trading in any stock. The Regulator does not function like the market maker on current exchanges and does not participate in the trading of the stock, either as an agent for others or on his own account.

BRIEF DESCRIPTION OF DRAWINGS

FIG. 2 is a schematic diagram of the sequence of operations in the order execution computer.

FIG. 3 is a schematic diagram of the sequence of operations of block 95 or block 97 of FIG. 2.

FIG. 4 is a further detail of the sequence of operations at point 100 of FIG. 2.

FIG. 5 is an information flow diagram which parallels the hardware system of FIG. 1.

HARDWARE DESCRIPTION

Figure 1:
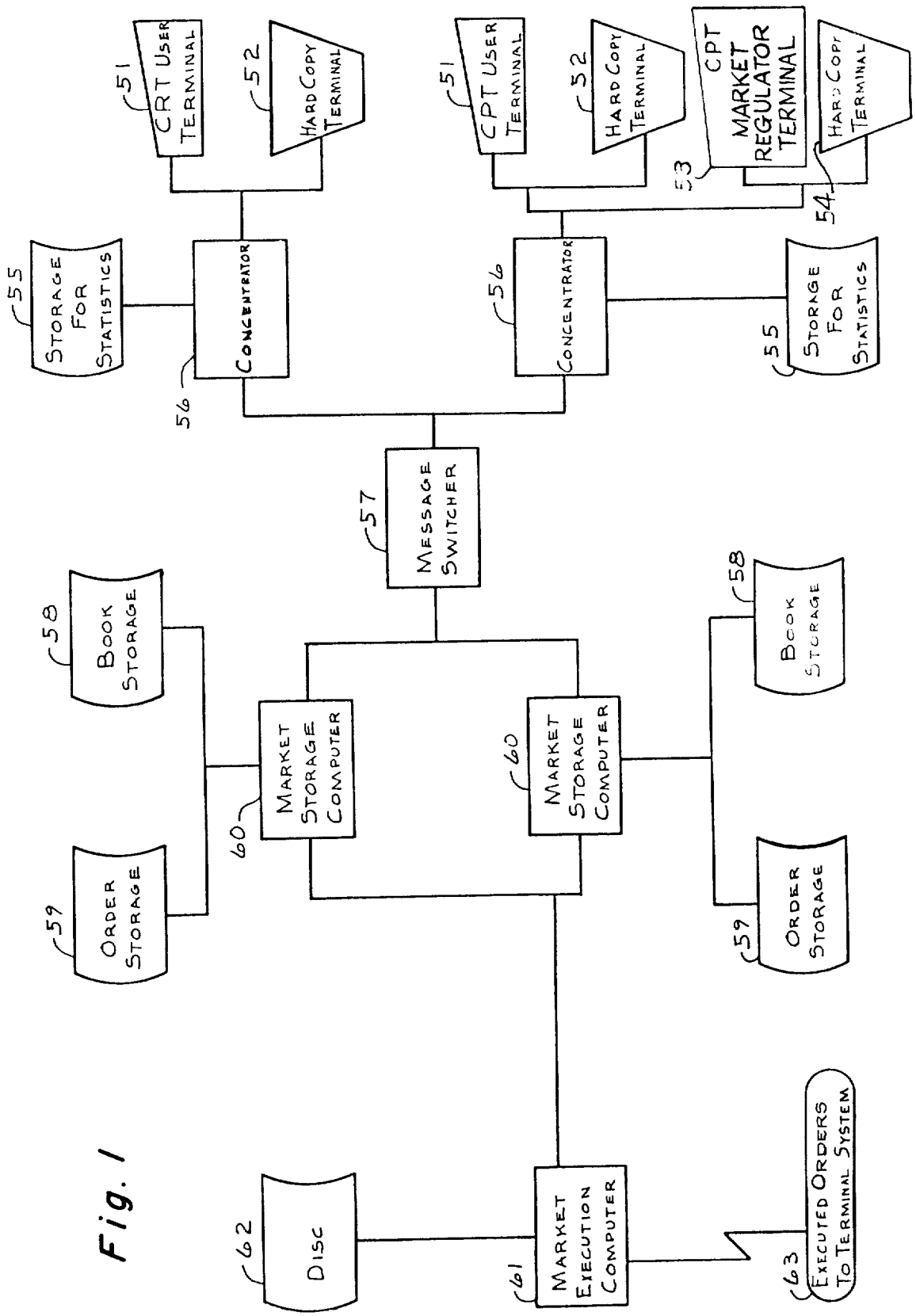
FIG. 1 is a schematic diagram of the basic hardware system for the order entry and order enactment subsystems.

The various elements making up the automated exchange of this invention and their interrelationships are shown in schematic FIG. 1.

In each member broker's office, is a CRT user terminal 51 and associated hard copy terminal 52. A plurality of these terminals will communicate directly with a concentrator computer 56. The concentrator computer 56 buffers messages from user terminals 51 and translates them at high speed to message switcher 57. The concentrator computer 56 would normally be geographically located near the user terminals to take advantage of its high speed transmission for long distance communication. Associated with each concentrator 56 is a storage area for accumulation of relevant statistics. All of the concentrator computers 56 communicate with a central message switcher 57.

Message switcher 57 transmits information and instructions from each concentrator 56 to the market storage computer 60 for that stock and information about pending orders and executions of the exchange from the proper market storage computer 60 to the proper concentrator 56 for a given user.

Each market storage computer can handle a certain number of stocks depending on the volume and although only two such computers were shown, it is apparent that the disclosed exchange is modular and additional market storage computers 60 may be added as required.

Associated with each market storage computer 60 is an order storage area 59 where all of the pending orders for a given stock are stored in their proper queues. Also associated with each market storage computer is a display storage which is the summary of the order storage which may be requested by the useer. The market storage computer updates both order storage and display storage with each new order instruction, cancel instruction and each market execution cycle.

The central market execution computer 61 calls out each of the stocks sequentially from order storage 59 through market storage computer 60. Information about the executed orders is transmitted to the clearing system 63 and confirmation of the execution is returned to user terminals 51 and the order storage 59 and display storage 58 are updated as the market execution proceeds to the next stock.

The regulator has a special CRT terminal 53 and hard copy terminal 54. Into this terminal are entered instructions which may stop trading in a given or in all stocks, and limit the price fluctuations both between trades and between trading cycles.

The member broker may enter on his terminal 51 orders to purchase or sell stocks orders to cancel stocks, and requests to display, from display storage 58 the summary of the current orders in a given stock. The user will receive back on either the CRT terminal 51 or associated hard copy terminal 52 the information requested as well as information about executions of orders previously placed.

The concentrator computers 56 perform a variety of functions. They query all CTR terminals 51 in a sequence and check each received order or request for internal consistency and queue the orders for passage to message switcher 57. Concentrator 56 also transmits system responses received by message switcher 57 to the correct user and decides whether it should be transmitted to CRT terminal 51 or hard copy terminal 52.

An exemplary system including numbers of devices is set out below.

| No. | Make | Model | |
|-----|------|-------|---|
| 300 | I.B.M. | CRT console | CRT user terminal 51, 53 |
| 300 | I.B.M. | 3213 | HAR copy terminal 52, 54 |
| 20 | I.B.M. | 3158 | concentrators 56 |
| 1 | I.B.M. | 3158 | message switcher 57 |
| 5 | I.B.M. | 3158 | market storage computer |
| 10 | I.B.M. | 3333-3330 | order storage 59 |
| 1 | I.B.M. | 3158 | market executor computer 61 |
| 1 | I.B.M. | 3333-3330 | disk 62 |
| 20 | I.B.M. | 3330-3330 | disk |

ORDER ENTRY SYSTEM

The information flow in this system is shown in the left half of FIG. 5. The information flow corresponds to the hardware configurations of both FIGS. 1 and 6.

REGULATOR DECISIONS

FIG. 5 shows the possible flows of this record 200. The order entry subsystem 201 while accepting any record submitted by the market regulator would, through response 202, transmit all errors found back to his terminal. The order entry system 201 has associated with it, with reference to FIG. 1, the concentrator 56, message switcher 57, and market storage computer 60, indicated generally as queues 202. The regulator could supercede the instructions by submitting another record containing them before the execution phase of the call through. The record moves through the queues 202 to the market execution computer 61 where the data on the record is used to pudate the information contained on the queues 203. Information feedback indicating that the system has responded to the receipt of this record would be the change of values on the book display 204.

Preferably the market regulator must give two instructions before the system will accept his record. He must enter the record, the system 202 responds for verification, then he must indicate that the record is correct. The system indicates acceptance to him through his terminal.

If no trades were executed over an extended number of cycles, the system would generate a message giving this information to the market regulator. He could then determine the problem by calling either the book display 204 or he could query directly the unexecuted records held by the system queues 203.

ORDER INSTRUCTION

The broker enters a command to buy 206 or sell 207 a stock into his terminal. If there are errors, the response system 202 displays error messages. If there are no errors the system displays to the broker the record for verification. At this point, the broker may discard the order or signal that he wishes the order entered into the system. The broker thus must give two commands to enter an order into the system. First he must place the order, secondly he must indicate that the order is correct.

The system now accepts the order and types the order record together with the time of acceptance on the terminal. The record moves through the queues 203 to the market execution computer 61 where it is used to update the data on the book display 204 and entered into the listing of orders in queues 203.

FIG. 5 also gives the continuing path of the orders. The market execution computer 61 sets the order up for execution and places it on its disk. The market execution computer will check the set of orders for each stock issue it controls to determine if trades are possible. If there are not, the computer skips the execution phase for that stock. If there are orders which could be executed, they are taken from the disk associated with the market execution computer to the computer for execution. The order may be executed in which case a record of this is sent for ticker tape display 208, 209 and the blotter 210. The backup of the blotter is saved by the system and executed orders are available in the statistical display system 211, 212. These transactions are fed through the market execution computer 61, queues 203 and order entry system 201 update the customer's account.

If the order is not executed, it is passed back to the disk associated with the market. The display of the book is calculated to reflect the unexecuted orders.

There are various methods of clearing the stock from the selling customer's account to buying customer's account and the money from the second account to the first. My preferred system is for each customer to clear with the exchange and for the exchange in effect to clear with itself. To this end, the transaction record in the blotter 210 is split in two, the seller's record is returned to his file as a sale to the exchange and the buyers record is returned to his record as a purchase from the exchange.

CANCEL INSTRUCTION

The flow of the cancel instruction 207 is also shown on FIG. 5. After the message concentrator receives the instruction, it tests 202 for errors. If there are errors, the record with an error message is returned to the terminal and destroyed. If there are no errors, the record is returned to the terminal for verification. At this point, the broker may either destroy the instruction or he may indicate its accuracy. If the instruction is verified, the record passes through the order entry system 201 to the market execution computer 61 which searches for the order. If the order is not found, the computer destroys the cancel command and passes a message back through the order entry system, and records that fact with broker at 206. If the order is found, a message to that effect together with a copy of the record found, is passed to the relevant terminal 206. The computer deletes the order updates the book display 204 and saves the cancel instruction.

DISPLAY REQUEST

A display request 205 will be tested to make sure the stock exists. If it does, it will be immediately accepted and shunted to the proper market via the message switcher. Market will locate the relevant display and pass a copy of it back to relevant terminal via the message switcher. A copy of the request is kept and a new display is periodically sent to the relevant terminal so that the customer may quickly appraise the market.

ORDER EXECUTION SYSTEM

The system attempts to execute all orders possible at the current market price. It first executes limit orders which overlap the market price. Stop orders are tested for their stop prices and, if met, are put in the market queue. It then executes all orders in which one side of the trade is a limit and the other side is a market. This is again executed at the current market price. It then executes all orders possible where both sides of the trade are market orders. The prices is then allowed to move. First, price movement is tested by matching limit orders against market orders within the market regulator's constraints. If this indicates that new price is warranted then again overlapping trades at the new market price are executed. Market price is next allowed to move in the case where no market orders exist, or where market orders exist, but the market limit match is incompatible with the normal movement of price. In this situation, limit orders on both sides of the market are tested against one another, a new market price which is the limit price closest to the old market price is tested against the market regulator's constraints. If this calculated market price is allowable or within the market regulator's constraints, the sequence beginning this paragraph is executed at the new market price.

After all possible trades have been executed within the market regulator's constraints, the market queues are tested to determine if any trades exist in which the broker chooses to override the constraints set by the market regulator. This order is passed against the opposing limit order at the limit price. This type of order is designed to provide instant liquidity for those people who desire to pay the price for instant liquidity. This price, however, is not used to reflect current market price. Any imbalance between current market price and executed price should normally be handled by the market regulator, and this type of trade should seldom be used.

The order execution phase of the exchange will be further described with reference to FIGS. 2, 3 and 4. The market execution computer 61 calls for a given stock in sequence from its order storage area 59.

After the queues are established for the call through the current stock, the initial entry point 80 is reached. The queues are then tested to determine if there are any limit buy orders above or at the market price, and limit sell orders below or at the market price 82. If the system machines limit buy and limit sell orders and executes them at the market price 83. The system then determines if there are orders on the stop sell queue with the stop sell price at or above the market price 80. If this occurs, the stop sell orders are placed at the back end of the market sell queue where they are executed last 85. The system next tests to determine if there are orders on the stop buy queue with a stop price at or below the market price. If this is the case, the stop buy orders are placed at the back of the market buy queue 87. In 88, the system tests to see if there are limit buy orders at or above the market price and orders on the market sell queue. If this is the case, limit buy orders and orders on the market sell queue are executed at the market price. 90 tests to determine if there are limit sell orders at or below the market price, and orders on the market buy queue. 91 shows that the limit sell and orders on the market buy queue are executed at the market price. In 92, the system tests to determine if there are orders on both the market buy and the market sell queue. If this is seen to be the case, the market orders are executed at the current market price, until one or the other of the two queues is exhausted.

The system then tests to determine which of the two queues 94 or 96 has emptied. If the market sell queue is empty, 95 is executed, and if the market buy is empty 97 is executed. The logic associated with these two blocks causes a change in the market price and is discussed in FIG. 3. In 98, the system tests to determine if both limit sell and limit buy orders exist. If they do exist, then a check is made to determine whether the limit sell price is lower than the limit buy price. If this is the case, it may be possible to again move the market price. The detailed logic involved with 100 is presented later and is shown in FIG. 4.

Upon return from this part of the logic, the system tests for any unexecuted instantaneous orders in either the market buy or market sell files. If opposing limit orders exist, they are matched with the instantaneous orders at the opposing limit price. This price is not used to define a new market price, however.

If instantaneous orders do not exist, or if there are no opposing limit orders, then the system tests to determine if trading has occurred. If no trading has occurred, the system will generate a new market price from the current market price, plus the market increment supplied by the market regulator.

If the movement of the last trade was up, new market price will be above old market price. If the movement of the last trade was down, new market price will be below old market price 105. A test is conducted 106 to determine the new market price exceeds the fluctuation limits allowed by the market regulator. If not, the new market price becomes the market price. If not, the old market price is retained.

At this point 108, the information contained in the book display is updated. The queues containing the unexecuted orders are passed back to the correct market computer, the market execution computer selects the next stock and the program returns to point 80 in FIG. 2. The detail of the market buy limit sell and the limit buy market sell logic is symmetric, thus only one diagram FIG. 3 has been shown. The logic of the market buy limit sell case is described and differences between it and the limit buy market sell is indicated.

Block 110 indicates entry into the market buy limit sell case. The system first checks to determine that a limit sell order exists. If not, control passes to point 122 of FIG. 3. This is also indicated on FIG. 2. The system next tests to determine if the limit sell price is greater than the market price. If it is not, block 113 is bypassed. If the limit sell price is indeed greater than the current market price, the system tests to make sure that the movement in the current market price to the limit sell price is within the market regulator's constraints for price change per order, and price change per cycle. This is block 113. If this test is negative, no trades may be executed and control is returned to 122 in the diagram. If this test is positive, a trade is possible and the system tests in block 114 to determine whether a stop or a stop limit buy order has been placed in the market queue. If it is indeed a market order rather than a stop order, block 118 is executed. If, however, a stop order exists, then in block 115, the system tests the stop price to make sure it is above the limit sell price. If the stop price is below the limit sell price, then the stop order should not be executed. 120 shows that the stop buy order is moved to the front of the stop by queue. If the test in 115 holds, the order is then checked to see if a stop limit buy order 116 exists. If not, logic control jumps to 118. If it is a stop limit buy order, 117 tests the limit price on the stop limit order to insure that the stop limit price is not above the limit price on the limit sell order. If it is above the limit price on the limit sell order, the stop limit order is removed from the system because the stop limit price has been exceeded.

In this case, logic flows to block 121, and the system asks whether another order exists on the market buy queue. If 118 is successfully reached, a price change is in order. The new market price then becomes the limit price or the old market price, whichever is higher, and logic control returns to the top of FIG. 2, block 81. It can be seen from this diagram that if a trade cannot be executed, system control returns to point 122, and if a trade can be executed, the identical sequence of tests used on initial entry, only in this case, with a new market price, are followed. This insures that priority is identical. In the case of limit buy market sell, the question asked in 111 is does a limit buy order exist. If the answer is no, system control returns to 122. If the answer is yes, then the system tests to determine if the limit buy price is less than the market price 112.

If the answer is no, 113 is bypassed. If the answer is yes, then the system tests to determine if the movement from the current market price to the limit buy price is within the market regulator's limit for price change per order and price change per cycle. If the answer to this test is no, control is moved to 122. If the answer to this test is yes, then the order on the market queue is tested, to see whether it might be a stop sell or a stop limit sell order 114. If it is not a stop order, then control is released to 118. If it is a stop, or stop limit order, then 115 tests to determine whether the stop price on the stop or the stop limit order is above the limit buy price.

If the answer to this question is yes, then the stop or the stop limit order is moved back to the front of the stop sell queue. If the answer to this test is no, then the system tests to determine whether the order is a stop limit sell order. If the answer to this question is no, control is released to 118. If the answer to this test is yes, then the system tests to make sure that the stop limit price on the stop limit sell order is below the limit price on the limit buy order. If this answer to this test is yes, the limit price on the stop order has been exceeded and the stop order is removed from the system 119.

The market queue at this point is again tested to determine if a market sell order exists. If the answer to this question is yes, then control moves to 111. If the answer to this question is no, system control turns to 122. In the event that a price change is in order, 118 is extended, and the sequence of tests associated with the price change in FIG. 2 are executed.

The sequence of events associated with the limit buy limit sell case are somewhat simpler because no stop orders are placed on the limit files. It is possible that the price associated with a limit buy order may be above that of a limit sell order but a movement in the current market price must be made before execution. The possible new current market price will be the limit price closest to the current market price. This is shown in block 124.

SPECIFIC EXAMPLES

The operation of the exchange can be illustrated by the following examples of trading in a single stock. The examples are purposely simplified and neither illustrate an expected trading situation nor each of the features contained in the exchange disclosed elsewhere in this specification.

EXAMPLE NO. 1

This example shows how the system matches a market buy order with a limit order and develops a new market price. It also shows how a single order on one side of the market may be matched with several orders at different prices.

| INITIAL ORDERS | | | | |
|---|---|---|---|---|
| (Last Trade at 20) | | | | |
| Order No. | Amount | Type | Price | Customer |
| 1 | 500 | MB | — | 1 |
| 2 | 100 | LS | 20 | 2 |
| 3 | 100 | LS | 21 | 3 |
| 4 | 400 | LS | 22 | 4 |

| QUEUES | | | | | | | | |
|---|---|---|---|---|---|---|---|---|
| LIMIT | | | | | | MARKET | | |
| BUY | | | SELL | | | BUY | | SELL |
| Cus | Amt | Pr | Cus | Amt | Pr | Cus | Amt | Cus | Amt |
| None | | | 2 | 100 | 20 | 1 | 500 | none | |
| | | | 3 | 100 | 21 | | | | |
| | | | 4 | 400 | 22 | | | | |

| ORDER EXECUTIONS | | | | | |
|---|---|---|---|---|---|
| No. | Type | Buyer | Seller | Amount | Price |
| 1 | MB v LS | 1 | 2 | 100 | 20 |
| 2 | MB v LS | 1 | 3 | 100 | 21 |
| 3 | MB v LS | 1 | 4 | 300 | 22 |

| REMAINING AFTER EXECUTION | | | | |
|---|---|---|---|---|
| (Last Trade at 22) | | | | |
| Order No. | Amount | Type | Price | Customer |
| 4 | 100 | LS | 22 | 4 |

EXAMPLE NO. 2

This example shows how the system matches limit orders which overlap the current market price. It also shows the order of execution. First; overlapping limits, then a market order with an overlapping limit order, and finally market orders are traded. The market price does not change in this example.

| INITIAL ORDERS | | | | |
|---|---|---|---|---|
| (Last Trade at 20) | | | | |
| Order No. | Amount | Type | Price | Customer |
| 1 | 100 | LS | 19 | 1 |
| 2 | 300 | LB | 21 | 2 |
| 3 | 400 | MS | — | 3 |
| 4 | 300 | MB | — | 4 |

| QUEUES | | | | | | | | |
|---|---|---|---|---|---|---|---|---|
| LIMIT | | | | | | MARKET | | |
| BUY | | | SELL | | | BUY | | SELL |
| Cus | Amt | Pr | Cus | Amt | Pr | Cus | Amt | Cus | Amt |

-continued

| 2 | 300 | 21 | 1 | 100 | 19 | 4 | 300 | 3 | 400 |

ORDER EXECUTIONS

| No. | Type | Buyer | Seller | Amount | Price |
|---|---|---|---|---|---|
| 1 | LS v LB | 2 | 1 | 100 | 20 |
| 2 | LB v MS | 2 | 3 | 200 | 20 |
| 3 | MB v MS | 4 | 3 | 200 | 20 |

REMAINING AFTER EXECUTION

| Order No. | Amount | Type | Price | Customer |
|---|---|---|---|---|
| 4 | 100 | MB | — | 4 |

EXAMPLE NO. 3

This example shows that stop orders are moved from the stop to the market queue when their stop price is reached. They are then executed as though they were market orders. Because a price rise may move through the limit price on the stop order, the limit price is checked after each price increase.

INITIAL ORDER
(Last Trade at 20)

| Order No. | Amount | Type | Limit Pr. | Stop Pr. |
|---|---|---|---|---|
| 1 | 400 | SB | 22 | 21 |
| 2 | 100 | SB | 22 | 20 |
| 3 | 200 | MS | | |
| 4 | 100 | MS | | |
| 5 | 100 | MB | | |

QUEUES

| STOP BUY | | | | MARKET | | | |
|---|---|---|---|---|---|---|---|
| | | | | BUY | | SELL | |
| Cus | Amt | L. Pr. | S. Pr. | Cus | Amt | Cus | Amt |
| 2 | 100 | 22 | 20 | 5 | 100 | 3 | 200 |
| 1 | 400 | 22 | 21 | | | 4 | 100 |

The stop buy price for the order for customer 1 is at the last trade price. The order is moved to the market queue.

THEN QUEUES BECOME

| STOP BUY | | | | MARKET | | | |
|---|---|---|---|---|---|---|---|
| | | | | BUY | | SELL | |
| Cus | Amt | L. Pr. | S. Pr. | Cus | Amt | Cus | Amt |
| 1 | 400 | 22 | 21 | 5 | 100 | 3 | 200 |
| | | | | 2 | 100 | 4 | 100 |

ORDER EXECUTIONS

| No. | Type | Buyer | Seller | Amount | Price |
|---|---|---|---|---|---|
| 1 | MB v MS | 5 | 3 | 100 | 20 |
| 2 | SB v MS | 2 | 3 | 100 | 20 |

REMAINING AFTER EXECUTION

| Cust. & Order No. | Amount | Type | Limit Pr. | Stop Pr. |
|---|---|---|---|---|
| 1 | 400 | SB | 22 | 21 |
| 4 | 100 | MS | — | — |

EXAMPLE NO. 4

This example is identical to example No. 1 except that the constraints of the market regulator have been added. In this example, trading would be stopped after the maximum price change per cycle had been reached.

INITIAL ORDER
(Last Trade at 19)
Maximum price change per transaction is $1.00
Maximum price change per cycle is $2.00

| Cust. & Order No. | Amount | Type | Price |
|---|---|---|---|
| 1 | 500 | MB | — |
| 2 | 100 | LS | 20 |
| 3 | 100 | LS | 21 |
| 4 | 400 | LS | 23 |

QUEUES

| LIMIT SELL | | | | MARKET BUY | | | |
|---|---|---|---|---|---|---|---|
| | SELL | | | BUY | | SELL | |
| BUY | Cus | Amt | Pr | Cus | Amt | Cus | Amt |
| None | 2 | 100 | 20 | 1 | 500 | | |
| | 3 | 100 | 21 | | | | |
| | 4 | 100 | 23 | | | | |

ORDER EXECUTIONS

| No. | Type | Buyer | Seller | Amount | Price |
|---|---|---|---|---|---|
| 1 | MB v LS | 1 | 2 | 100 | 20 |
| 2 | MB v LS | 1 | 3 | 100 | 21 |

REMAINING AFTER EXECUTION
(Last Trade at 21)

| Order | Amount | Type | Price | Customer |
|---|---|---|---|---|
| 1 | 300 | MB | — | 1 |
| 4 | 400 | LS | 23 | 4 |

EXAMPLE NO. 5

In this example, the order to cancel an order existing on a queue was submitted. This example also shows that the system is not limited to round lot orders.

REMAINING AFTER EXECUTION
(Last Trade at 20)

| Order No. | Amount | Type | Price | Customer |
|---|---|---|---|---|
| 1 | 100 | MB | | 1 |

NEW ORDERS

| Order No. | Amount | Type | Price | Customer |
|---|---|---|---|---|
| 2 | 100 | cancel | | 1 |
| 3 | 105 | MB | | 3 |
| 4 | 107 | MS | | 4 |

QUEUES
MARKET

| BUY | | SELL | |
|---|---|---|---|
| Cus | Amt | Cus | Amt |
| 3 | 105 | 4 | 107 |

ORDER EXECUTIONS

| No. | Type | Buyer | Seller | Amount | Price |
|---|---|---|---|---|---|
| 1 | MB v MS | 3 | 4 | 105 | 20 |

REMAINING AFTER EXECUTION
(Last Trade at 20)

| No. | Amount | Type | Customer |
|---|---|---|---|
| 4 | 2 | MS | 4 |

INPUT MESSAGES AND SYSTEM RESPONSES

The current embodiment of exchanges accepts three different messages as input to the system.
(a) customer orders to purchase or sell a stock
(b) customer orders to cancel a request for stock purchase or sell
(c) instructions from the market regulator.

The display entitled *Description of Input Records Broker's Instructions* gives the information submitted by the broker for the customer.

The display entitled *Description of the Market Regulators Decisions* shows the information the market regulator may submit to the system.

The system immediately prints the message it has received. A sample of this is shown on the display entitled *Display of the Order Cancel and Regulate Commands at Input*. In the event of an error, the system responds by citing an error and the message. The display of sample ERROR messages is an example of this system response.

If no errors are associated with an order to buy or to sell, the order is placed on the proper queue and when executed the blotter indicating both sides of the trade is printed. A sample of this is entitled *Display of the Blotter*. The first line is the buy side, the second is corresponding data for the sell side.

There are other messages generated by the system in response to ongoing operations. For example, a message is generated by the system when an order is removed from the queue as well as when an order is not found on the queue. A sample of system response to a cancel command is included on the figure entitled System Response to Conditions.

Several responses are shown under System Respond To Conditions. First is the response when the limit of a stop limit order has been exceeded. Second is the response when no new regulator decision has been entered. Third is the response to a cancel instruction when the corresponding order is found.

The most informative response of the system from the point of view of the customer is the book. This display gives the current market price, and a synopsis of the orders currently associated with a particular stock. The sample display of the market regulator information which governs the market is printed with the book and is shown in Figure entitled Display of Market Regulator Decisions.

| DESCRIPTION OF INPUT RECORDS | | |
|---|---|---|
| Column | Name | Description |
| | | BROKER INSTRUCTIONS |
| 1-8 | ID | The word order or the word cancel |
| 9-15 | A(1) | Total number of shares involved in the order |
| 16-22 | A(2) | Transaction 1 = buy,2 = sell,3 = limit buy, 4 = limit sell,5 = stop buy,6 = stop sell 7 = stop limit buy 8 = stop limit sell 9 = instantaneous buy,10 = instantan |
| 23-29 | A(3) | limit or stop price if needed |
| 30-36 | A(4) | Broker and customer ID |
| 37-43 | A(5) | Stock ID |
| 44-50 | A(6) | Actual price of transaction |
| 51-57 | A(7) | Number of shares involved in the transaction |
| 58-64 | A(8) | Transaction number for this order |
| 66-73 | A(9) | Limit price if a stop limit |
| | | REGULATOR'S DECISIONS |
| 1-8 | ID | The word regulate |
| 9-15 | A(1) | The new market price |
| 16-22 | A(2) | The maximum price change per transaction |
| 23-29 | A(3) | The maximum price change per cycle |
| 30-36 | A(4) | Execute or do not execute stop orders |
| 37-43 | A(5) | Execute or do not execute this cycle |
| 44-50 | A(6) | Max price on fluctuation if no trade |
| 51-57 | A(7) | Min price on fluctuation if no trade |
| 58-64 | A(8) | Increment if no trade |
| 65-71 | A(9) | =0 if set up =1 if change in decisions |
| 72-78 | A(10) | =DP change the direction of price movement if no trade |

| DISPLAY OF SAMPLE ERROR MESSAGES |
|---|
| (1) Input Record Stop Sell Without Stop Price |
| "Possible error, limit on stop limit sell is zero. Processing continues." |
| 900.00    9.00    0.0  3.00    20.00 |
| (shares)  (tr type)  (Br Cust)  (St ID) |

| | | | | DISPLAYS | | | | | | | |
|---|---|---|---|---|---|---|---|---|---|---|---|
| | | | | DISPLAY OF THE ORDER, CANCEL, AND REGULATE COMMANDS BEFORE EXECUTION | | | | | | | |
| Broker Input Regulator Input | Order Cancel Regulate | Size New Mkt Price | Tr. Type Max. Chg. Trans | L.P. or S.P. Max. Chg. Cycle | Br. Cust. Ex. Stops | St. Id. Ex. Orders | Tr. Pr. No. Tr. Chg. Max | No. Sh. No. Tr. Chg. Min | Tr. No. No. Tr. Inc. | LPif No Chg | SL DP Chg. |
| | regulate | 48.00 | 3.00 | 5.00 | 0.0 | 0.0 | 55.00 | 43.00 | 2.00 | 1.00 | |
| | order | 900.00 | 2.00 | 0.0 | 3.00 | 20.00 | 0.0 | 0.0 | 0.0 | 0.0 | |
| | order | 400.00 | 2.00 | 0.0 | 3.00 | 20.00 | 0.0 | 0.0 | 0.0 | 0.0 | |
| | order | 600.00 | 9.00 | 0.0 | 3.00 | 20.00 | 0.0 | 0.0 | 0.0 | 0.0 | |
| | order | 100.00 | 4.00 | 51.00 | 3.00 | 20.00 | 0.0 | 0.0 | 0.0 | 0.0 | |
| | order | 100.00 | 8.00 | 48.50 | 3.00 | 20.00 | 0.0 | 0.0 | 0.0 | 48.25 | |
| | order | 100.00 | 7.00 | 49.00 | 3.00 | 20.00 | 0.0 | 0.0 | 0.0 | 49.50 | |
| | order | 100.00 | 7.00 | 49.00 | 3.00 | 20.00 | 0.0 | 0.0 | 0.0 | 54.00 | |
| | order | 100.00 | 8.00 | 45.00 | 3.00 | 20.00 | 0.0 | 0.0 | 0.0 | 0.0 | |
| | cancel | 100.00 | 8.00 | 45.00 | 3.00 | 20.00 | 0.0 | 0.0 | 0.0 | 0.0 | |
| | finish | 0.0 | 0.0 | 0.0 | 0.0 | 0.0 | 0.0 | 0.0 | 0.0 | 0.0 | |

The column headings are abbreviations of those set out in the first and second input records above.

| DISPLAY OF THE BLOTTER | | | | | | | | |
|---|---|---|---|---|---|---|---|---|
| 0.0 | 9.000 | 0.0 | 3.000 | 20.000 | 48.000 | 600.00 | 1.000 | 0.0 |
| 300.000 | 2.000 | 0.0 | 3.000 | 20.000 | 48.000 | 600.000 | 1.000 | 0.0 |
| 0.0 | 7.000 | 49.000 | 3.000 | 20.000 | 50.000 | 100.000 | 1.000 | 54.000 |
| 200.000 | 2.000 | 0.0 | 3.000 | 20.000 | 50.000 | 100.000 | 2.000 | 0.0 |
| 100.000 | 9.000 | 0.0 | 3.000 | 20.000 | 60.000 | 800.000 | 1.000 | 0.0 |
| 0.0 | 4.000 | 60.000 | 3.000 | 20.000 | 60.000 | 800.000 | 1.000 | 0.0 |
| 0.0 | 9.000 | 0.0 | 3.000 | 20.000 | 65.000 | 100.000 | 2.000 | 0.0 |
| 0.0 | 4.000 | 65.000 | 3.000 | 20.000 | 65.000 | 100.000 | 1.000 | 0.0 |
| SYSTEM RESPONSE TO CONDITIONS | | | | | | | | |

-continued

System response when the price has exceeded the limit condition of a stop limit order
"100.000 7.000 49.000 3.000 20.000 0.0 0.0 0.0 49.500
The stop order above was deleted from the system because the limit price was exceeded"
System response to no new market regulator decisions
"No regulate card has been entered this cycle. There must be one on the first cycle."
System response to a cancel instruction when the corresponding order is found.
"This order has been removed 100.00 8.00 45.00 3.00 20.000 0.0 0.0 0.0 0.0"

OUTPUT RECORDS
DISPLAY OF MARKET REGULATOR DECISIONS

| | |
|---|---|
| Market price is | 50.00 |
| Maximum price change per transaction is | 3.00 |
| maximum price change per cycle is | 5.00 |
| stop order parameter is | 0 |
| execute parameter is | 0 |
| movement of last price is | 0.0 |
| maximum price if no trade is | 56.00 |
| minimum price if no trade is | 42.00 |
| incremental change if no trade is | 2.00 |

DISPLAYS OF THE BOOK (1)

| | | |
|---|---|---|
| The market price is | | 50.00 |
| the number of market buy shares is | | 0. |
| the number of market buy orders is | | 0. |
| the number of market sell shares is | | 800. |
| the number of market sell orders is | | 3. |
| book for limit sell | | |
| number of shares | number of orders | price |
| 100. | 1.. | 51.000 |
| book for stop buy | | |
| number of shares | number of orders | price |
| 200 | 2. | 49.000 |

(2)

| | | |
|---|---|---|
| the market price is | | 48.00 |
| the number of market buy shares is | | 0. |
| the number of market buy orders is | | 0. |
| the number of market sell shares is | | 800. |
| the number of market sell orders is | | 3. |
| book for limit sell | | |
| number of shares | number of orders | price |
| 100. | 1. | 51.000 |
| book for stop buy | | |
| number of shares | number of orders | price |
| 200 | 2. | 49.000 |
| book for stop sell | | |
| number of shares | number of orders | price |
| 100 | 1. | 45.000 |

(3)

| | | |
|---|---|---|
| the market price is | | 48.00 |
| the number of market buy shares is | | 600. |
| the number of market buy orders is | | 1.0 |
| the number of market sell shares is | | 1300. |
| the number of market sell orders is | | 2. |
| book for limit sell | | |
| number of shares | number of orders | price |
| 100. | 1. | 51.000 |
| book for stop buy | | |
| number of shares | number of orders | price |
| 200 | 2. | 49.000 |
| book for stop sell | | |
| number of shares | number of orders | price |
| 100 | 1. | 48.500 |
| 100 | 1. | 45.000 |

FILE DESCRIPTIONS

The following descriptions together with the associated flow charts in the drawings disclose the invention. The references to files and program names are to those which appear on pages 65-139 which are Fortran source code and have been cancelled from the specification.

The programs are for a single stock "20" and operate in a batch mode. That is all of the bids, offers, cancels and regulates are entered, then queued then executed at once.

Elsewhere are described the multi-stick real time simulated open board improvements which I contemplate as an advanced stage of the system.

This prototype operated on an IBM 360/165 computer. It operated on a high speed batch operation known as the WYLBUR system in the FORTRAN language. The files were Tape 11—This file serves two functions. First, the decisions of the market regulator and the current market price of a given stock are saved upon it during the time cancel and order instructions are being processed. Cancel instructions associated with market buy and instantaneous buy orders are placed on this file then matched with existing orders on Tape 21. New market buy and instantaneous buy order instruction are placed on this file before being merged in with the existing unexecuted orders. This file is also used as a scratch file.

Tape 12—This file is used as a scratch file for Tape 22. Cancel and new order instructions are processed using this file. Cancel instructions associated with market sell and instantaneous sell orders are placed on this file, then matched with existing unexecuted orders on Tape 22. New Market sell and instantaneous sell orders are placed on this file before being merged in with the existing unexecuted orders.

Tape 13—This file is used as a scratch file for Tape 23, and new order instructions are processed using this file. Cancel instructions associated with limit buy orders are placed on this file, then matched with existing unexecuted orders on Tape 23—New limit buy orders are placed on this file before being merged in with existing unexecuted limit buy orders.

Tape 14—This file is used as a scratch file for Tape 24. Cancel and new order instructions are processed using this file. Cancel instructions associated with limit sell orders are placed on this file, then matched with existing unexecuted orders on Tape 24. New limit sell orders are placed on this file before being merged in with existing unexecuted limit sell orders on tape 24.

Tape 15 This file is used as a scratch file for Tape 25. Cancel and new order instructions are processed using this file. Cancel instructions associated with stop buy and stop limit buy orders are matched with existing orders on Tape 25. If the order is not found on Tape 25, it is matched against Tape 21 as stop and stop limit buy orders are moved to this tape before execution. New stop and stop limit buy orders are placed on this file before being merged in with existing unexecuted orders on Tape 25.

Tape 16—This file is used as a scratch file for Tape 26. Cancel and new order instructions are processed using this file. Cancel instructions associated with stop and stop limit sell orders are matched with existing orders on Tape 26. If the order is not found on Tape 26, it is matched against Tape 22 as stop and stop limit sell orders are moved to this tape before execution. New stop and stop limit sell orders are placed on this file before being merged in with existing unexecuted orders on Tape 26.

Tape 17—This file contains market regulator, cancel, and order instructions for a particular stock issue.

Tape 21—This file contains all unexecuted market buy and instantaneous buy orders for a given stock issue. These orders are sorted so that those accepted by the system appear on the file earlier. Stop buy and stop limit buy orders may be added to this file if the market price of a stock rises above the stop price. Orders are deleted from this file when matched with any sell order.

Tape 22—This file contains all unexecuted market sell and instantaneous sell orders for a given stock issue. These orders are sorted so that those accepted by the system appear on the file earlier. Stop sell and stop limit sell orders may be added to this file if the market price of a stock falls below the stop price. Orders are deleted from this file when matched with any buy order.

Tape 23—This file contains all unexecuted limit buy orders for a given stock issue. These are sorted so that those containing the highest limit price are further forward in the queue. If two orders have the same limit price the orders accepted by the system first is furthest forward in the queue. Orders are deleted from this file when matched with any sell order.

Tape 24—This file contains all unexecuted limit sell orders for a given stock issue. These orders are sorted so that those containing the lowest limit price are further forward in the queue. If two orders have the same limit price the order deleted from this file when matched with any buy order.

Tape 25—This file contains all unexecuted stop and stop limit buy orders for a given stock issue. These orders are sorted by stop price so that those containing the lowest stop price are further forward in the queue. If two orders have the same stop price the order accepted by the system first is furthest forward in the queue. This file is checked after each movement in market price to determine if the market price has risen above the stop price. If this is the case, the order is transferred to the market buy file. Stop buy orders already on the market buy file are transferred to this file if the market place falls below the stop price. Stop limit buy orders are destroyed if the market price rises above the limit price of the stop limit buy order.

Tape 26—This file contains all unexecuted stop and stop limit sell orders for a given stock issue. These orders are sorted by stop price so that those containing the highest stop price are further forward in the queue. If two orders have the same stop price, the order accepted by the system first is furthest forward in the queue. This file is checked after each movement in market price to determine if the market price has fallen below the stop price. If this is the case, the order is transferred to the market sell queue. Stop sell orders already on the market sell file are transferred to this file if the market price rises above the stop price. Stop limit sell orders are destroyed if the market price falls below the limit price of the stop limit sell order.

Tape 27—The cancel instructions are moved from Tape 17 and placed on this file initially. They are then moved to the correct scratch file so that they may be matched with existing unexecuted orders.

Tape 28—The order instuctions are moved from Tape 17 and placed on this file initially. They are then moved to the correct scratch file so that they may be merged with existing unexecuted orders.

Tape 32—This is the printer. All communication from the system to the user is written on this file. This communication consists of error messages as well as the display of the books.

Tape 50—This file contains the instantaneous balance accounts of all customers. Before acceptance of an order the system determines whether a customer exists and if he exists whether he has sufficient funds or certificates in his account to cover the trades.

Tape 76—This tape passes executed trades to the accounting subsystem of the exchange so that each customer's instantaneous balance sheet and his transaction file may be updated.

PROGRAM DESCRIPTIONS

Main

The subroutine named MAIN controls the actions of the Order Enactment subsystem generally by calling other subroutines. What follows is a description of this routine. Where subroutines are called, a brief description of the subroutine is presented. Subroutines are discussed in more detail in subsequent sections.

IREAD is called. This routine separates order, cancel, and regulate instructions. It tests each instruction for errors before acceptance. Order instructions are placed on Tape 28. Cancel instructions are placed on Tape 27. The market regulator's decisions, if any, are stored and added to the previous unchanged decisions made.

The current market regulatory decisions are printed in MAIN.

The subroutine ORDER is called. This routine organizes orders into queues and deletes orders upon receipt of a cancel command. These operations would be part of an order entry subsystem in a real time environment.

A test is next made to determine whether the market regulator allows any trades to execute. If no trades are to be executed, the system writes the decisions of the market regulator on file 11 and moves to the next iteration.

If trades are allowed, MAIN calls subroutine NOSEVE. This program insures that a priority is maintained upon entry to the call through and for every price change. The priority maintained is discussed in NOSEVE.

After NOSEVE has executed, it is possible that a limit buy and a limit sell order may have overlapping limit prices, but that a change from the current market price is necessary before a trade is possible. MAIN calls LPC to test for this situation. If overlapping prices do not exist or if a price change is not possible, control is returned to MAIN.

At this point, a customer may wish to trade against the wishes of the market regulator. He is allowed to do so. Because large price changes could occur, prices which result from this form of execution are not considered as new market prices by the system.

INST is called by MAIN to test for unexecuted instantaneous trades which may exist on the Market Buy File. If instantaneous trades exist, they are matched against orders which exist on the Limit Sell File and executed at the limit sell price. This segment of the operation halts when either queue empties, or when no more instantaneous trades exist. All unexecuted orders are returned to their respective queues.

ANT is called next by MAIN to test for instantaneous trades which may exist on the Market Sell File. If instantaneous trades exist, they are matched against orders which exist on the Limit Buy File and executed at the limit buy price. This segment of the operation halts when either queue empties, or when no more instantaneous trades exist. All unexecuted orders are returned to their respective queues.

It may be that new information entering the market between execution phases of the call through cycle has caused the orders to move away from the market enough so that no existing trades take place. If the movement is severe enough, of course, the market regulator would reset the price using the regulator card. However, the system has the capability to adjust the market price if no trades have occurred in this cycle.

MAIN next calls the subroutine CPRICE which tests for execution. If no execution has occurred, the price is allowed to automatically vary between limits set by the market regulator. If the last executed trade which moved the price increased it, the new market price would be raised by an increment set by the market regulator. If the last executed trade which moved the price decreased it, the new market price would be decreased by an increment set by the market regulator. If the regulator does not wish to use this option, he may set the upper and lower limits to the same value or may set the increment to zero. If the market regulator wishes only market orders to execute, he may reduce the maximum price change per transaction to zero.

MAIN now calls BOOKS to generate a summary of the orders on QUEUE as well as the market regulators instructions for display to the customer.

At this point, processing for a call through of a single issue of stock is complete.

NOSEVE

NOSEVE is called by MAIN and elsewhere in the system whenever a price change is imminent. Its purpose is to insure that the priority of orders is maintained.

The basic philosophy underlying the order in which the queues are tested for execution is this: first, limit orders, then market orders, and finally, stop orders. Here instantaneous orders are a type of market order and stop limit orders are a type of stop order.

NOSEVE calls subroutine LBLSOL which executes all orders in which there is both a limit buy and a limit sell overlap. Orders are executed at the current market price as long as an overlap in both the limit buy and the limit sell files exist. Unexecuted or partially executed orders are returned to their respective queues at the conclusion of this segment of the operation.

MAIN now tests the market regulator's decision to allow processing of stop orders. If stop orders are not to be processed, MAIN calls LBMSOL which is discussed below. If stop orders are to be processed, STOPOL is called. A stop overlap may occur when the market price is up to the stop price on a stop sell order. STOPOL tests the stop buy and the stop sell queus for stop and stop limit orders in which a stop overlap occurs. All overlapping stop orders are placed at the back of their relevant market queues.

NOSEVE then calls subroutines LBMSOL which matches overlapping limit buy orders with market sell orders. These trades are processed at the existing market price until either queue empties or until no more overlapping occurs. Unexecuted or partially executed orders are returned to their respective queues at the conclusion of this segment of the operations.

NOSEVE calls subroutine LSMBOL which matches overlapping limit sell orders with market buy orders. These trades are processed at the exisiting market price until either queue empties or until no more overlapping occurs. Unexecuted or partially executed orders are returned to their respective queues.

Market buy orders are then matched against market sell orders in the routine known as MARKET. Matching continues untl either queue empties. Partially completed orders, if any, are returned to the single remaining non-empty queue. Both queues may, of course, have emptied simultaneously.

MARLIM is next called. As either the market buy or the market sell files are now exhausted, it remains to discover which queue, if any, is non-empty. Subroutines associated with MARLIM match market buy orders against limit sell orders which may cause the price to rise, or market sell orders against limit buy orders which may cause the market price to fall. If a new market price is warranted, control again passes to NOSEVE. Execution of this section of the system ceases when either the limit or market queue empties, when the maximum price change per trade is exceeded, or when the maximum price change per cycle is exceeded. Unexecuted or partially executed orders are returned to their respective queues.

ORDER

Upon entry to order, the cancel commands are located on tape 27 and the order commands are located on tape 28.

Order calls SORTS which first sorts cancel commands from tape 27 to tapes 11 through 16 depending upon the type of transaction. A subroutine of SORTS called RSORT then sorts the orders on the limit and stop queues by limit and stop price.

Order then calls Match to remove any non-executed orders from their respective queues.

Order next calls sorts to sort the orders on to tapes 11 through 16 depending upon the type of transaction.

Order then calls MERGEM to merge the new orders with the old orders.

Order then calls Books to display the book before execution of the call through. Control is then returned to MAIN.

IREAD

After reading a command off the input file IREAD tests the first word to determine whether it is an order, a regulate, or a cancel command. If the first word is a finish command the end of an iteration has been reached. If none of these possibilities occurs an error message is printed. Order commands are copied to tape 28. Cancel commands are copied to tape 27.

Regulate commands are tested in a subroutine called REROR. An option on the regulate card informs the system whether all files are to be opened in a startup procedure or whether market regulator decisions already exist. A regulate card is not needed every cycle but one must exist if the system is starting up for the first time. Because of this an error message is printed if no regulate card exists. At the close of this routine, files 27 and 28 which could contain data are endfiled then rewound. If no market regulator card exists, this cycle existing regulator information is read off of File 11. Control is then returned to MAIN.

CKEM

Subroutine CKEM is called to insure that decisions of the market regulator are within preset tolerances. The decisions so limited are the new market price, the maximum price change per transaction and the maximum price change per cycle.

TABLE OF CKEM TESTS

| Element | Element Description | Test | Action If Test Has Failed |
|---|---|---|---|
| 1 | New Market price | Greater than 1/5 and less than 5 times old market price | No trades except instantaneous trades allowed |
| 2 | New maximum price change per trade | Greater than 1/5 and less than 5 times price change per trade | No trade except instantaneous trade allowed |
| 3 | New maximum price change per cycle | Greater than 1/5 and less than 5 times old price change per cycle | No trade except instantaneous trade allowed |

REROR

When a market regulate carrd is found in IREAD, control is passed to the subroutine REROR which tests the regulate card for errors and supercedes old decisions made by the regulator with new ones presented on the regulate card.

Initially a test is made to determine if the system is just starting for the day. If it is not, old decisions existing on File 11 are read in. If the regulator card contains a zero for any decision, the system assumes the old information read from File 11 should be used. If File 11 contains no information, the system will read all information from the regulate card.

The subroutine CKEM is called to insure that the current decisions of the market regulator are within a range consisting of five times to one-fifth of the previous market decisions. The decisions so limited are the new market price, the maximum price change per transaction and the maximum price change per cycle. Limits on the market regulator's ability to induce changes having been fixed with respect to this program, but may, of course, be changed to any value. Other decisions of the market regulator may also be brought under control. These include maximum price change, minimum price change and incremental change if there if no trade.

TABLE OF TESTS

| Element Number | Element Description | Test | Action If Test Has Failed |
|---|---|---|---|
| 1 | New market price | 1/5 to 5 times old market price | No trades except instantaneous trades allowed. No trade switch turned on |
| 2 | New maximum price change per trade | 1/5 to 5 times old market price | No trades except instantaneous trades allowed. No trade switch turned on |
| 3 | New maximum price change per cycle | 1/5 to 5 old market price | No trades except instantaneous trades allowed. No trade switch turned on |
| 4 | Switch to process or not process stop orders | Must be 0 or 1 | Switch set to 1 |
| 5 | Switch to process or not process all orders | Must be 0 or 1 | Switch set to 1 |
| Change in price move if no trade | Must be $-1$, 0 or $+1$ | | Set to 0 |

[Once the old regulation decisions and new regulation decisions have been merged, these tests are made]

| | | | |
|---|---|---|---|
| FP | Market Pr. | Must be positive | No trade switch turned on |
| CCYCLE | Maximum pr. change per cycle | Maximum price change per cycle must be greater than maximum change per trade (CTRANS) | CCYCLE = CTRANS |
| QMAX | Maximum price to which system may fluctuate if there is no trade | QMAX must be greater than FP | Incremental change set to zero |
| NOGO | Switch to process or not process all orders | Must be 0 or 1 | Switch set to 1 |
| NOSTOP | Switch to process or not process stop orders | Must be 0 or 1 | Switch set to 1 |

SORTS

After all tests have been made, control returns to IREAD. Routine SORTS sorts the cancel commands from Tape 27 onto the appropriate scratch file and the order commands onto the appropriate scratch file. The arguments carried by the system into SORTS are M which tells the calling routine whether or not any commands actually existed and LL which tells SORTS which tape it is to process.

After checking the scratch files to make sure they are properly rewound, cancel or order commands are read from the file being processed. These commands are checked for internal consistency in MERROR. MERROR is discussed separately later. If the command is found to be internally consistent, then number 10 is added to the second argument of the record which gives the type of transaction. Thus, market buy commands are written on Tape 11, market sell commands are written on Tape 12, limit buy commands are written on Tape 13, limit sell commands are written on Tape 14, and stop buy sell commands are written on tape 15 and stop sell commands written on tape 16. This pattern is modified somewhat by instantaneous commands and by stop limit commands. The index is altered so that instantaneous commands are placed on either of the market scratch files and so that stop limit commands are placed on either of the stop scratch files.

When the end of the tape being processed, generally Tape 27 or Tape 28, is reached, the index M is tested to determine whether the tape contained any commands. If there were none, program control is returned to order.

If commands exist, all files containing orders are rewound. The scratch files 13 through 16 are then processed individually. The orders are read into an array and this array is passed to a subroutine called RSORT. The array is then sorted and the commands read back onto their respective scratch files. Either the order or cancel commands, whichever are being processed, associated with scratch file 13 and with scratch file 16 are sorted so that the third argument in the array, either the limit buy or the stop sell price with the highest value is furthest forward in the queues. The commands associated with scratch file 14 and with scratch file 15, the limit sell and stop buy commands, are sorted so that those commands with the highest value for the third argument in the array are furthest back in the array. Remember that limit buy and stop sell orders with the highest price are executed first and that stop buy and limit sell orders with the lowest price are executed first.

After the arrays are properly sorted onto the scratch files, control returns to ORDER.

MERGEM

Routine MERGEM merges new orders in with existing orders. The merging operation merely consists of adding the new market and instantaneous orders to the back end of their corresponding files. This is because market orders are processed in the order in which they were accepted by the system. When the scratch file containing new orders is exhausted, this operation is complete.

In order to merge Files 23 through 26, the following operations are carried out. First, the existing orders for a particular file are read into an array. Then the orders from the corresponding scratch file are read into the same array. Then RSORT is called with the appropriate arguments for number of orders, type of sort, and element of the order being sorted on. Upon return from RSORT the sorted array is placed upon the relevant working file. Files 23 through 26 are processed in this fashion. After MERGEM is through with File 26, control returns to ORDER.

As the files are now assembled correctly, ORDER releases control to MAIN and the market enactment phase of the system begins.

MATCH

Routine MATCH checks cancel orders against orders currently existing on the working file. If there is a match the order is destroyed.

The files containing the market orders are initially positioned. Cancel market, cancel stop and cancel stop limit commands are read into array D until the scratch file containing the commands is exhausted. The unexecuted market buy orders are then read from the market files until these are exhausted. The arguments of the cancel market buy command are checked against the arguments of all unexecuted market buy orders. The transaction number, the limit or stop price, and the broker and customer identification numbers must be the same. In an actual run, the stock ID would also be the same. Other information such as the time the system accepted the order would be submitted with the cancel instruction in a real time environment and would be very helpful in locating and cancelling the unexecuted order if it existed. The number of shares originally associated with the order would not be tested as the order could have partially executed. If a match between the order and the cancel is found, the computer prints out the order which has been cancelled. Unfound cancel instructions are returned to the scratch file and unfound order instructions are returned to the working file. Market sell commands on Rile 22 and cancel stop and stop limit sell commands on File 16 are processed identically.

It is necessary to test the commands to cancel stop instructions against existing market orders because the stop orders are moved to the market queue before they are executed. This section of MATCH has been placed before before the main section which follows. It should logically come after the following section so that time could be saved. Efficiencies in storage as well as time of execution may be developed by computer experts. It is necessary for them only to know what the system must accomplish with this step.

Each of the six working files is now tested against its corresponding scratch file. All unexecuted orders are first read off the queue, a cancel is read off the corresponding scratch file and a match is sought. If the match is found, a message to this effect is printed. If a match is not found, the order does not exist in the system and a statement to this effect is printed. Another cancel instruction associated with a particular file is read in until the scratch file is exhausted. Existing orders are copied back onto the correct working file and the next corresponding set of files is processed. Upon completion of this operation system control returns to ORDER.

CLEAN

Routine CLEAN returns an unexecuted or partially executed order back to its correct working file. The arguments passed to CLEAN by the calling subroutine are ITAPE, which is the working file or queue and VALUE, which is the order to be returned. In the normal course of events, one or more orders on working file ITAPE have been processed. It is thus important to remove these orders as well as insert the unexecuted order at the front of the working file.

First the scratch file is positioned correctly. Then the unexecuted or partially executed order carried in VALUE is written on the scratch file. Then all unexecuted orders on ITAPE are written to the scratch tape. Both the scratch tape and the working tape are not rewound. The unexecuted orders on the scratch tape are copied to the working tape. Any orders which were already executed are destroyed in this step. Both the working and the scratch tapes are rewound and control is returned to the calling subroutine.

This method was used to keep from backspacing the working file and inadvertently saving orders which were already executed.

MOVE

Routine MOVE is similar to CLEAN except that there is no order which the system must insert. This routine must only destroy orders existing on the working file ITAPE which have already been executed. Orders are read off the working file and written on the scratch file until the working file is exhausted. If orders exist on the scratch file, both files are rewound and the unexecuted orders are copied from the scratch file to the working file. Control is then returned to the calling subroutine.

This method of copying files was used to keep from backspacing the working file and inadvertently saving unexecuted orders.

BACK

Routine BACK is similar to CLEAN except that it places an unexecuted order in back of all other orders on the working file. The arguments passed to this subroutine are ITAPE which is the working file, and A, an array containing an unexecuted order.

After correctly positioning both files, the routine reads an order off the working file and writes it to the scratch file. When the end of the file is reached, the array A is read on the scratch file. All files are then rewound and the information on the scratch file is copied to the working file. The working file is then rewound and control is passed to the calling subroutine.

At this point in the order of operations, there will be orders left upon the market buy queue, orders left upon the market sell queue, or orders left upon neither queue. MARLIM must determine which queue if any contains market orders. It then passes control to a subroutine which matches market buy orders against limit sell orders called MBLS or to a subroutine which matches limit buy orders against market sell orders called LBMS.

After both market files are positioned an index is set to zero. An attempt is made to read the market buy file. If the attempt is successful, the index M is set to 1. An attempt is then made to read the market sell file. If this attempt is successful, the index N is set to 1. If M is not zero, MBLS is called. If M is zero and N is not zero, LBMS is called. Upon return from either of these subroutines, control is returned to the MAIN program.

MARLIM could be improved by jumping around the attempted read of the sell file if the read of the buy file is successful. Or conversely, a test could be made to determine if the read attempt was successful for both files. If this happened, the system could indicate that a system error existed.

LBLSOL

This routine attempts to read an order off the limit buy queue and off the limit sell file. If the initial read is unsuccessful any orders read are returned to the files and control is returned to the calling program. If the read is successful for both queues the routine checks to insure that the limit buy is greater than the current market price and the limit sell is less than the current market price. If either of these conditions are false return the orders to their respective queues and return control to the calling routine. If both of these conditions hold, execute is called. Upon return from execute LBLSOL determines which of the two orders were filled and attempts to read an order from the relevant queue on the opposite side of the market. Proceed as at the beginning of the program.

MARKET

Program MARKET reads in unexecuted orders from the market buy and market sell queue and routes the orders to CKSL which tests the stop price and the stop limit price. If the stop and stop limit prices are within the correct bounds or if a stop order is not involved in the trade orders are routed to EXECUT where the blotter is formed. Market reads a new order from the revelant queue and proceeds as above.

If the order is found by CKSL to be not executable, market reads a new order from the revelant queue and proceeds as above.

Upon exhaustion of one or both of the market queues, MARKET places the remaining portion of the unexecuted order, if any, back on the correct market queue and returns control to the calling routine.

STOPOL

This routine first reads a stop buy or stop limit buy. If the stop buy price is less than or equal to the market price the order is placed at the back of the market buy queue. Another stop buy order is then read from the stop buy queue. The order is returned to the front of the stop buy queue when the stop buy price is greater than the market price. The stop sell or stop limit sell is tested in an analogous fashion. In this case, if the stop sell price is greater or equal to the market price the stop sell order is placed at the rear of the market sell queue.

When all stop overlaps are exhausted, control is returned to the calling routine.

LBMS or MBLS

These routines process the limit queue against the market queue to develop a new market price.

First these two queues are read. If the attempt to read them fails, the orders are stored on these relevant files and control is returned to MARLIM. If the attempt succeeds, then two tests are made. First, the price movement that would result from a trade at the limit price is tested to insure that the constraints with respect to price change for an order and price change for the cycle are not exceeded. If they are exceeded the orders are returned to their revelant files and control returns to MARLIM.

If the market regulator's constraints are not exceeded, CKSC is called to insure the order from the market file, if a stop or stop order, is within bounds. If it is not, an attempt is made to read another order from the market file. If no order exists, store unexecuted orders and return to MARLIM. If there is still an order to process, market price becomes the limit price, the orders are stored in their relevant queues, and control jumps to NOSEVE. Additional information concerning these important routines may be found in the discussion of FIG. 3.

CKSL

Routine CKSL orders on the market file to determine if they are stop or stop limit orders. If they are not, control is returned to the calling routine.

If a stop or stop limit is encountered, and if the stop price exceeds the market price, the stop order is removed from the market file and MRGIN is called. If the stop price does not exceed the market price, and if the order is not a stop limit, control is returned to the calling routine. If a stop limit order is involved, a check is made to determine whether the stop limit price is exceeded. If it is, the stop limit order is removed from the market queue and discarded, a message is printed, the number of shares is zeroed out, and control is returned to the calling routine.

MRGIN

Routine MRGIN is called by CKSC. Its purpose is to place orders where the stop price has been exceeded at the front of the relevant stop file.

CKSL reads all of the existing orders on the stop file into an array, then it places the stop order which was on the market queue in the array. The array is sorted by stop price and then written to the correct stop queue. The queue is rewound and control is returned to CKSL.

INST or ANT

These routines search the market queues looking for unfilled orders in which the broker wishes to execute at any price. INST searches the market key queue and ANT searches the market sell queue. Their operation is symmetric.

The market buy queue is first searched completely. If no orders of this nature are found the market sell file is searched. If an order is not an instantaneous order it is written to a working file. After the queues have been searched or no opposing limit orders are found, these working files are rewound and the unexecuted orders returned in the same order to their respective market queues. Control is then returned to the calling routine.

If no orders of this nature are found, control is returned to the calling routine. After an instantaneous order is found, an attempt is made to read the opposite limit file. If this is unsuccessful, the order is returned to its relevant market queue.

If a limit order it found, EXECUT is called. The trade will be executed at the limit price but the market price is then reset. A trade of this nature is not allowed to affect market price. A record of the transaction is printed out and the relevant files are again read to determine if additional trading of this nature is possible.

CPRICE

Routine CPRICE first changes the index which indicates to later iterations which way a price movement occurred. This index is DP. If the price has risen this iteration DP is set to +1, if the price has fallen DP is set to −1. The initial price for the next iteration is then set to the final price of this iteration, FPIX is the initial price of the next iteration, FP is the final market price of this iteration and control returns to MAIN.

If there is no difference between the initial market price and the current market price a test is made to determine if trades have been executed. The switch which gives the system this information is the index PD. PD is originally set to +1 in EXECUTE if trades have taken place. If trades have taken place the initial price for the next cycle is set to the final price for this cycle and control returns to MAIN.

If no trade has taken place, that is, if PD is zero, a test is made to determine if the incremental movement of the price is zero. If this is the case, the initial price for the next cycle is set to the final price for this cycle and control returns to MAIN.

If the incremental change is not zero, a test is made to determine if the price movement, DP is zero. This can happen when the system is starting up. If it is again the beginning price for the next cycle is set to the final price for this cycle and control is returned to MAIN.

If DP is not zero, a possible new market price is calculated by either adding to or subtracting from the current market price the amount of the increment. This possible price is checked to make sure it is within the limits set by the market regulator for automatic price fluctuations. If it is, it is accepted as the new market price, the beginning price for the next cycle is set equal to it, and control is returned to the MAIN program. If it is outside the limits, the option is not used, the market price remains what it was upon entry to CPRICE and control is returned to MAIN.

EXECUT

Routine EXECUT executes all orders. It receives an unexecuted buy order and an unexecuted sell order which have been matched by some other routine.

This routine first determines how many shares are to be involved in the trade. This is determined by which side of the transaction wishes to trade the least number of shares. The first argument in the buy order and the first argument in the sell order give this information. The actual number of shares traded is placed in the seventh argument of both the buy and sell orders. The market price, set where necessary in the calling subroutine, is placed in the sixth argument of both cards. The eighth argument is necessary because it may take many transactions to execute an order. Thus the transaction number of the order is important. For instance, a market sell of 150 shares could be executed against a market buy order of 50 shares, a market buy order of 70 shares, and a limit buy order of 30 shares.

Please note several things from the example above. First, there is no such thing as an odd lot. All orders are executed the same way. All orders, regardless of their size, thus have a chance to affect the market price. This would produce better continuity of the market price. Secondly, a person may have his order executed at several prices.

At this point, the blotter is printed to indicate the completion of the trade.

After the blotter is printed, a test is made to determine if an instantaneous trade has occurred. If it has, the system returns to the calling subroutine. If it has not executed an instantaneous trade, the switch indicating that a trade has taken place is set to one and system control returns to the calling routine.

BOOKS

Routine BOOKS is a report generator. It reads each queue and generates numbers of shares and numbers of orders for a given limit or stop price, if any. It generates only number of shares and number of orders for each market queue. It then prints this information, together with current market price. It then returns control to the calling routine. A sample of the output generated by BOOKS, is reproduced in the Section Input Messages and System Responses.

RSORT

The routine calling RSORT, generally SORTS, passes five arguments. The first is the array being sorted from, the second is the array being sorted to, the third is the number of elements in the array, the fourth is a switch indicating whether the sort is from low to high or from high to low, and the fifth is the element of the matrix used to sort the cancel or order command. Generally, the fifth argument is 3 which is the limit or stop price associated with a command. The commands are on the file only by the order in which they entered the system. This order is kept within equal values of the fifth argument. If the value of the fourth argument is set to 1, the commands with smaller values are entered first into the new matrix first. If the value of the fourth argument is set to 2, the commands with larger values are entered first into the new matrix.

The sort is fairly straightforward. Either a minimum or a maximum value from the third argument in all commands that still exist in the matrix being sorted from is found. This command is moved to the next unfilled position in the matrix being sorted to, a switch is set in the old matrix indicating that this command has been processed and the old matrix searched for the next highest or lowest third argument. The process is complete when all commands have been moved to the new matrix. System control then returns to SORTS where the new matrix is then stored on the correct file.

MERROR

Routine MERROR tests the order and cancel commands submitted for errors. If the command is a new order, the customer's instantaneous balance account is checked to insure that he has adequate funds and adequate stock to complete the transaction.

TABLE OF TESTS

| Element Number | Element Description | Test |
| --- | --- | --- |
| 1 | Number of shares | Must be greater than zero but less than 1,000 (This value has been set only for purposes of this routine to detect errors) |
| 2 | Type of transaction | Must be greater than zero but less than 11. |
| 3 | Limit or stop price | If the type of transaction is 1, 2, 9 or 10, a market or instantaneous order; this value must be zero. |
| 3 | Limit or stop price | If the type of transaction is 3 through 8, this value must not be zero. |
| 3 | Limit or stop price | Where valid, this value must be between a range of half to twice the current market price. If the books become very large this range may be narrowed to control the numbers of orders stored. |
| 4 | Broker ID, Customer ID | Both the broker and the customer must be identified |
| 5 | Stock ID | The stock must be identified |
| All | | All numbers must be less than 10,000. |

[At this point the cancel command has been completely processed and control returns to IREAD, if an order command is being processed.]

| | | |
| --- | --- | --- |
| 9, 3 | Stop limit buy price stop buy price | Stop limit buy must be greater than the stop buy price |
| 9, 3 | Stop limit sell price stop sell price | Stop limit sell price must be less than the stop sell price |
| 9 | Stop limit sell | This price should not be zero |
| 4 | Customer ID | Must be between 1 and 10 for comparison with the accounts processed by the back end. |
| 4 | Customer ID | The customer may not have been defined previously by the back end. |
| 4 | Customer ID | Customer may have neither enough stock nor enough money in his account at the present time. |

LSMBOL or LBMSOL

Upon entry into this routine first the market then the limit queue are tested for orders. If orders are not found on both queues, existing orders are returned to their queues and control returned to the calling routine. If orders are found the limit order is tested. If a limit buy, is the price above the market price? If a limit sell, is the price below the market price? If this is not the case the orders are stored and control is returned to the calling routine.

If there is a limit overlap with the market price, the order associated with the market queue must be tested using CKSL. If the market order is removed from consideration by CKSL an attempt to read another order from the market file is made.

If we still have an order after CKSL the orders are matched at the current market price and a test made to determine which queue should be read. The program then proceeds as at the top of the page.

LPC

This routine tests both limit queues for orders. If either queue does not have an order the existing orders are returned to their respective queues and control is returned to MAIN.

If both orders exist they are tested to determine if the limit sell price is equal to or below the limit buy price. If this is not the case, the orders are stored and control is returned to MAIN. If this test is passed, then the limit price closest to the current market price is selected as a prospective market price.

If this prospective price lies within the market regulator's limits for price change per trade and price change per cycle, the calculated price becomes the new market price, the orders are stored in their relevant queues and control is released to NOSEVE.

If none of these conditions are met, the orders are stored in the relevant queues and control is returned to MAIN.

ALTERNATE EMBODIMENT

Figure 6:
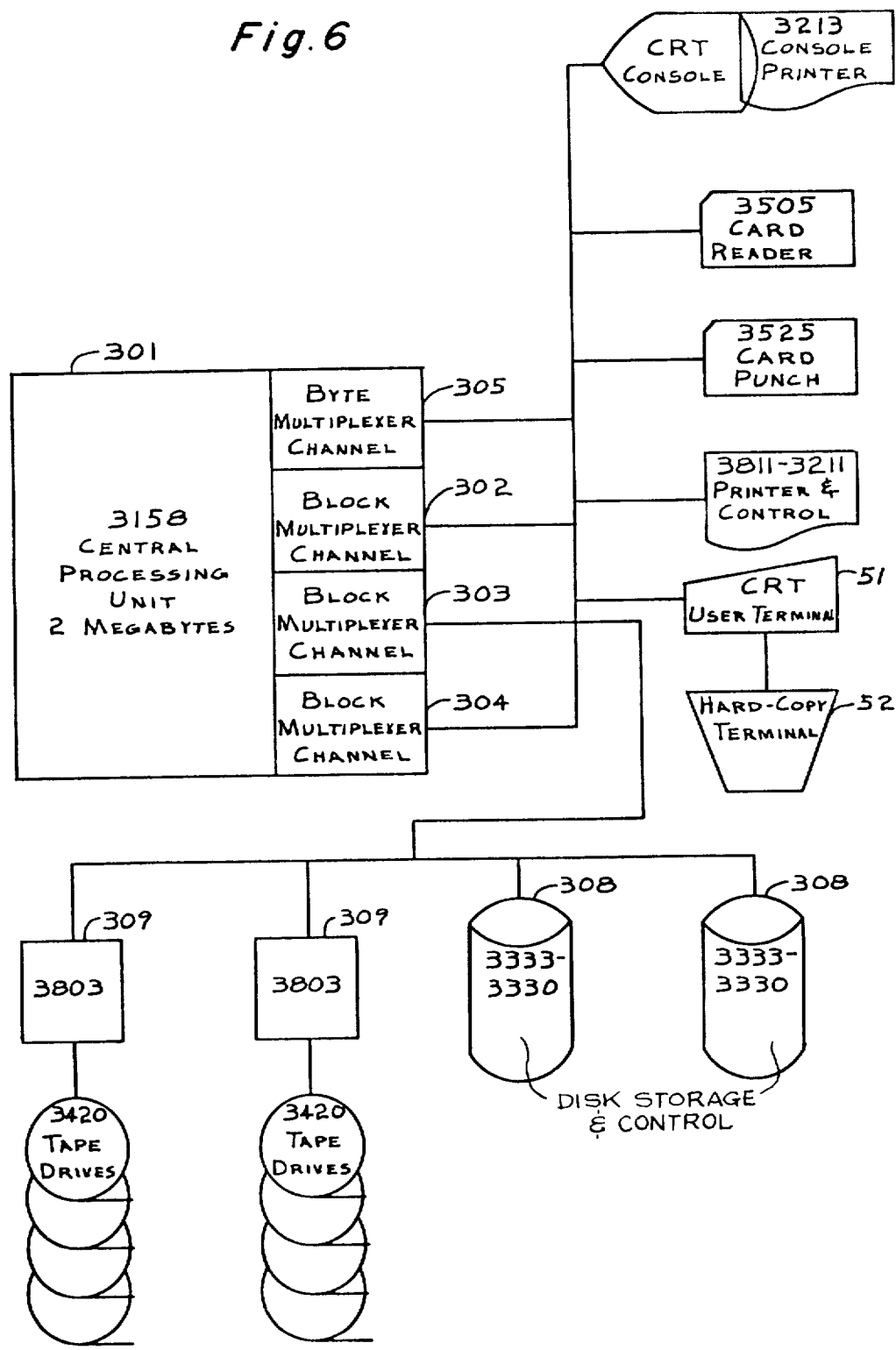
FIG. 6 is a schematic diagram of an alternative small scale system.

FIG. 6 represents a small scale special purpose computer system sufficient for operating of this exchange.

The central processing unit 301 would provide three high-speed channels 302, 303, 304 and one low-speed channel 305. The low speed channel would allow management of the system while the high speed channels would service the message switching 306 and the message storage 307 of the exchange. Relatively high speed access storage such as the book for each stock traded would be on the disks 308.

Lower speed access storage 309 would be provided for backup of disk storage for a log of all orders received and transmitted, and for storage or orders before execution by the market.

This system has the capacity to service a maximum of approximately 200 CRT terminals 51, 52, with a volume of perhaps 1000 orders per hour. A system of this size would be adequate to service the needs of 50 high volume stocks currently listed on the New York Stock Exchange.

There are many commercial real time software systems which could be used to bring the stock brokers orders into the system and prepare them for execution. The one that could be used on this system is Customer Information Control System or C.I.C.S., a product of I.B.M. The hardware and software components used, while not necessarily optimal, allow for maximum flexibility in the growth and development of the services rendered by the exchange.

The various hardware components are standard known I.B.M. equipment identified as central processing unit Model 3158; console printer, Model 3213, card reader Model 3505; card punch Model 3525; printer and control, Models 3811-3211; tape drives Model 3420; tape drive control unit Model 3803 and disk storage and control, Model 3333-3300.

Having described my invention as required by law, including the manner and process of making and using it, by disclosing the best mode contemplated for carrying out the invention, it will be apparent to those skilled in the art that the invention includes equivalent machines manufactures and processes. Therefore, I desire to be limited not by the particularity of the foregoing, but only to the scope of the invention in the following claims:

I claim:

1. The method of operating a computer to process data records containing information about transactions in fungible goods, such as securities, which are produced by a data input device and generating an output display comprising the steps of:

(a) storing in a designated area all data records relating to each security,
   (b) processing the data records relating to a first security in sequence in accordance with the following steps,
   (c) sorting the data records into a first subset, each containing information including a customer identifier, an offer to buy, an associated price, and the number of shares of the security, hereinafter limit buy orders, in a priority sequence beginning with the highest price,
   (d) sorting the data records into a second subset, each containing information including a customer identifier, an offer to sell, an associated price, and the number of shares of the security, hereinafter limit sell orders, in a priority sequence beginning with the lowest price,
   (e) sorting the data records into a third subset, each containing information including a customer identifier, an offer to buy at the market, and an order time, hereinafter market buy order, in a priority sequence beginning with the earliest time,
   (f) sorting the data records into a fourth subset, each containing information including a customer identifier, an offer to sell at the market, and an order time, hereinafter market sell orders, in a priority sequence beginning with the earliest time,
   (g) sorting the data records into a fifth subset, each containing information including a customer identifier, an offer to buy at the market above a certain or stop buy price, hereinafter stop buy orders, into a priority sequence beginning with the lowest stop buy price,
   (h) sorting the data into a sixth subset, each containing information including a customer identifier, an offer to sell at the market below a certain or stop sell price, hereinafter stop sell orders, into a priority sequence beginning with the highest stop sell price,
   (i) storing within said designated area, in a seventh subset, a data record containing the price of the latest transaction of said security, hereinafter the last trade price,
   (j) comparing each data record in said first subset with the record in said seventh subset to identify those records having a limit buy price above the last trade price,
   (k) comparing each data record in said second subset with the record in said seventh subset to identify those records having a limit sell price below the last trade price,
   (l) processing each such identified data record in said first subset in priority sequence against such identified records in said second subset at the last trade price, until the identified records of one subset are exhausted,
   (m) merging said processed records into new records stored in an eighth subset of data records relating to said security, said records containing a puchaser identifier, a seller identifier, a transaction price and an identifier for the number of shares in the transaction,
   (n) comparing each data record in said fifth and sixth subsets with said data record in said seventh subset to determine the stop buy orders at or below the last trade price and the stop sell orders at or above the last trade price and moving each such record to the end of the third and fourth subsets of data records,
   (o) comparing each of the data records in said first and second subsets to identify either limit buy orders at or above the last trade price or limit sell orders at or below the last trade price,
   (p) merging said identified records of limit order from said first or second subsets of data against opposed records of market orders at the last trade price and adding said new records to said eighth subset of data records, until the identified records in said first or second subset are exhausted,
   (q) merging the records of market orders from said third and fourth subsets of data at the last trade price and adding said records to said eighth subset of data records, until the identified records in said third or fourth subset are exhausted,
   (r) merging the remaining records of market orders from the unexhausted third or fourth subset of data against the records, in sequence of the records of limit orders of the second or first subset of data at the limit price until one of such subsets of records are exhausted,
   (s) comparing each such record added to the eighth subset with the record in the seventh subset to update the value of the last trade, according to the result of the comparison,
   (t) transferring control to process the data records relating to the next security.

* * * * *